(12) United States Patent
Alessi

(10) Patent No.: US 9,658,441 B2
(45) Date of Patent: *May 23, 2017

(54) SYSTEM AND METHOD FOR MOUNTING A SPECIMEN ON A SLIDE

(71) Applicant: Alessi Technologies, LLC, Ann Arbor, MI (US)

(72) Inventor: Vincent Alessi, Ann Arbor, MI (US)

(73) Assignee: Alessi Technologies, LLC, Ann Arbor, MI (US)

( * ) Notice: Subject to any disclaimer, the term of this patent is extended or adjusted under 35 U.S.C. 154(b) by 87 days.

This patent is subject to a terminal disclaimer.

(21) Appl. No.: 14/702,990

(22) Filed: May 4, 2015

(65) Prior Publication Data
US 2015/0234169 A1 Aug. 20, 2015

Related U.S. Application Data

(63) Continuation of application No. 13/153,159, filed on Jun. 3, 2011, now Pat. No. 9,052,522.

(60) Provisional application No. 61/351,187, filed on Jun. 3, 2010.

(51) Int. Cl.
G02B 21/26 (2006.01)
G02B 21/34 (2006.01)
G02B 7/00 (2006.01)

(52) U.S. Cl.
CPC ............ G02B 21/26 (2013.01); G02B 7/008 (2013.01); G02B 21/34 (2013.01)

(58) Field of Classification Search
CPC ...... G02B 7/008; G02B 7/00; G02B 21/0004; G02B 21/24; G02B 21/26; G02B 21/28; G02B 21/34; G01N 1/28; G01N 1/2813; G01N 2001/2826

USPC ....... 359/395, 391, 392, 393, 394, 398, 362; 435/176, 177, 180, 283.1, 287.1, 288.3, 435/288.4, 288.5, 305.1, 305.2; 436/174, 436/176, 177, 807, 809; 206/316.1, 456; 73/863, 863.01, 863.11, 863.81, 863.83, 73/863.86, 864.91; 356/36, 38, 244, 246
See application file for complete search history.

(56) References Cited

U.S. PATENT DOCUMENTS

| | | | |
|---|---|---|---|
| 3,247,721 A | 4/1966 | Julius | |
| 3,773,439 A | 11/1973 | Sheridan | |
| 4,235,711 A | 11/1980 | Koblanski | |
| 4,257,346 A | 3/1981 | Ornstein et al. | |
| 4,377,476 A | 3/1983 | Ferrara | |
| 5,176,446 A | 1/1993 | Chiba et al. | |
| 5,579,399 A | 11/1996 | Lucas | |
| 5,837,198 A | 11/1998 | Itani | |

(Continued)

*Primary Examiner* — Arnel C Lavarias
(74) *Attorney, Agent, or Firm* — Jeffrey Schox; Ivan Wong

(57) ABSTRACT

A system and method for mounting a specimen on a slide, the system having an immersion chamber, a stage, a transducer, and a pump. The immersion chamber is configured to hold a liquid and includes at least one wall, a closed bottom, and an open top. The stage is configured to support the slide, and the stage is arranged within the immersion chamber such that the specimen may be supported substantially above the stage by the liquid. The transducer is configured to induce a wave in the liquid in the immersion chamber such that the wave alters the motion of the specimen. The pump is configured to draw the liquid from the immersion chamber such that the level of liquid in the immersion chamber decreases and the specimen is dispensed onto the slide.

19 Claims, 3 Drawing Sheets

(56) References Cited

U.S. PATENT DOCUMENTS

| | | | |
|---|---|---|---|
| 5,961,298 A | 10/1999 | Bar-Cohen et al. | |
| 6,623,634 B1 | 9/2003 | Whitehurst | |
| 7,521,021 B2 | 4/2009 | Mccormick | |
| 7,600,457 B2 | 10/2009 | Voneiff et al. | |
| 9,042,013 B2* | 5/2015 | Alessi | G02B 21/34 359/391 |
| 9,052,522 B2* | 6/2015 | Alessi | G02B 21/34 |
| 2003/0077815 A1 | 4/2003 | Omata | |
| 2006/0281119 A1 | 12/2006 | Chan et al. | |
| 2008/0257074 A1 | 10/2008 | Fuchiwaki et al. | |
| 2011/0299157 A1 | 12/2011 | Alessi | |
| 2011/0299158 A1 | 12/2011 | Alessi | |
| 2015/0226951 A1* | 8/2015 | Alessi | G02B 21/34 359/395 |

\* cited by examiner

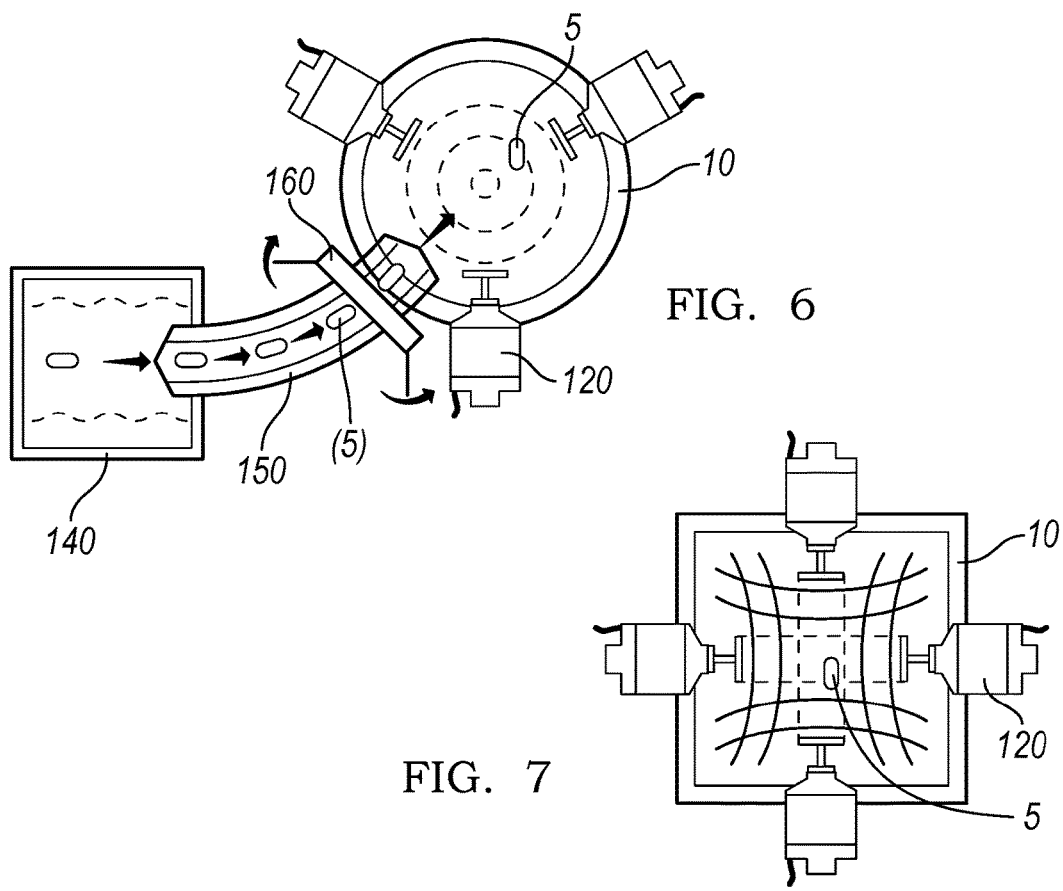
FIG. 6
FIG. 7
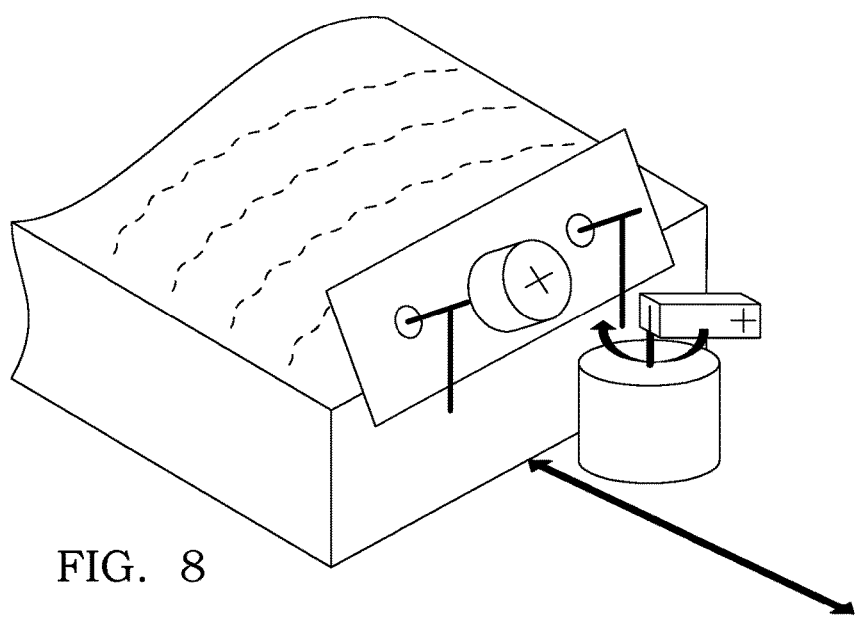
FIG. 8

SYSTEM AND METHOD FOR MOUNTING A SPECIMEN ON A SLIDE

CROSS-REFERENCE TO RELATED APPLICATIONS

This application is a continuation application of U.S. application Ser. No. 13/153,159 filed 3 Jun. 2011, which claims the benefit of U.S. Provisional Application No. 61/351,187 filed 3 Jun. 2010, which are each incorporated in its entirety by this reference.

TECHNICAL FIELD

This invention relates generally to the biological research field, and more specifically to a new system and method for mounting a specimen on a slide.

BACKGROUND

It is commonly desirable in biological laboratories to mount tissue sections, or 'specimens', to slides for purposes of examining the tissue sections using a microscope, treating the tissue sections with a stain or dye, and for other purposes. As shown in FIG. 1, conventional systems and methods for mounting specimens onto slides comprise placing tissue sections in a tall Petri dish filled with water; the specimens typically float on the surface of the water. The broad side of a slide is then rested on the rim of the Petri dish and the slide is angled down into the Petri dish such that the slide is partially submersed in the water. Subsequently, a small brush or glass capillary tube is used to manipulate a tissue section onto the slide. Typically, the slide is gradually drawn out of the water as additional tissue sections are arranged on the slide. Oftentimes, tissue is embedded in paraffin wax, sliced with a microtome, and then selected sections of the tissue are transferred to a hot water bath. The hot water bath partially melts the paraffin from around the specimens, and a glass slide treated with adherents is then used to scoop the tissue sections out of the hot water bath; the wax may help the tissue sections adhere to the slide. Conventional methods of mounting specimens on slides are thus difficult, time-consuming, and labor-intensive.

Therefore there is a need in the biological research field for a new system and a new method for mounting specimens onto slides. This invention provides such a system and method.

BRIEF DESCRIPTION OF THE FIGURES

FIGS. 6 and 7 are illustrations showing possible transducer arrangements for two-dimensional embodiments of the coordinated set of transducers according to embodiments of the invention; and FIG. 8 is an illustration of a possible realization of a transducer.

DESCRIPTION OF THE PREFERRED EMBODIMENTS

The following description of preferred embodiments of the invention is not intended to limit the invention to these preferred embodiments, but rather to enable any person skilled in the art to make and use this invention.

Figure 1:
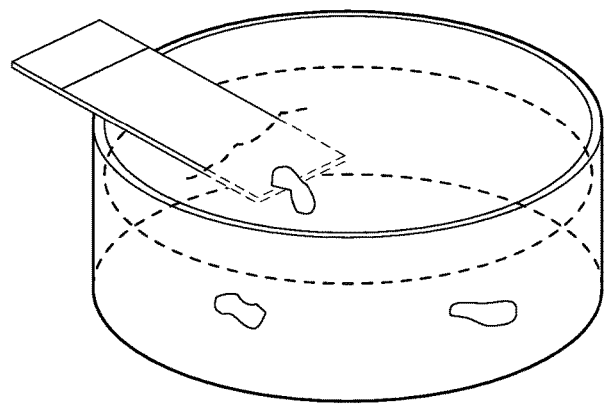
FIG. 1 is an illustration showing prior art systems and methods for mounting specimens onto slides.
Figure 2:
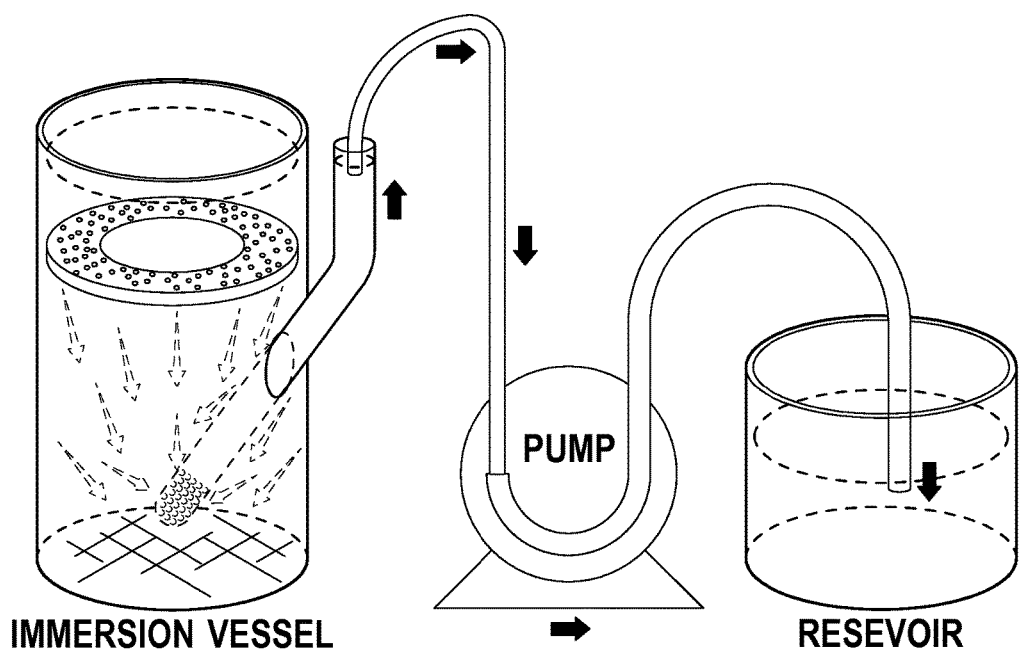
FIGS. 2, 3, 4, 5 are illustrations of a system for mounting specimens onto slides according to embodiments of the invention.
Figure 3:
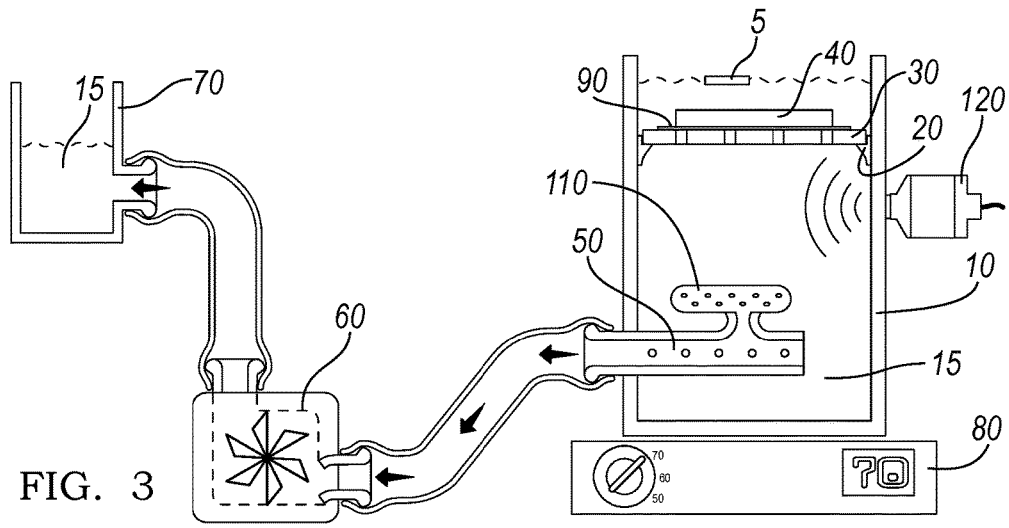
Figure 4:
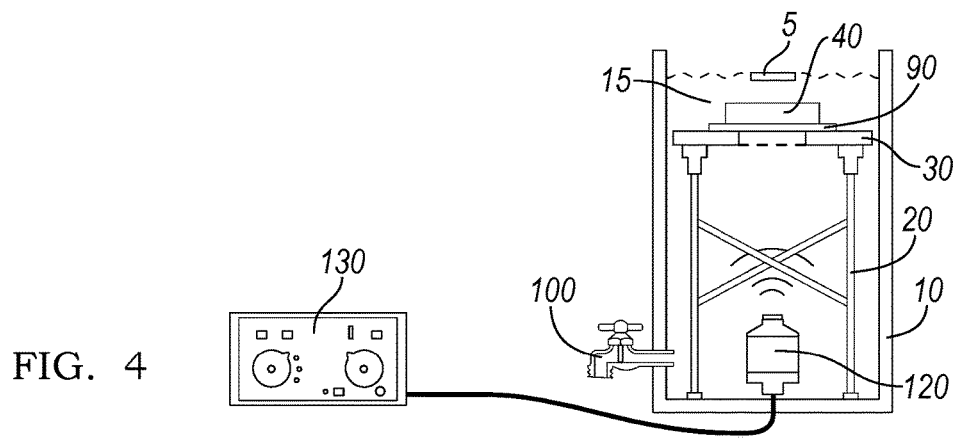

As shown in FIGS. 3 and 4, the system for mounting a specimen 5 onto a slide 40 includes: an immersion chamber 10 that holds a liquid 15; a stage 30 that locates a slide 40; a transducer 120 that induces a wave in the liquid 15 that alters that motion (or modifies the location) of the specimen 5; and a device that draws the liquid 15 from the immersion chamber 10, which can be a pump 60 (shown in FIG. 3), a valve 100 (shown in FIG. 4) or any other device. The system may also incorporate a manifold 50 (shown in FIG. 3) that allows liquid 15 to be drawn from the immersion chamber 10 from a plurality of locations, such as at two points at the bottom of the immersion chamber 10 or from one point at the bottom and one point in the middle of the immersion chamber 10. A support structure 20 that locates the stage 30 may also be included in the system. The system preferably incorporates a reservoir 70 that functions to contain liquid 15 drawn from the immersion chamber 10 (shown in FIG. 3). Furthermore, the system may incorporate a temperature control unit 80 that modifies or maintains the temperature of the liquid in or drawn from the immersion chamber 10 (shown in FIG. 3). Preferably, the system includes a filter 90 that separates debris, such as wax or pieces of the specimen 5, from the liquid so that the quality of the liquid in the system can be maintained (shown in FIGS. 3 and 4). Additionally, the system may also incorporate a baffle no that minimizes motion of the liquid tangent to the surface of the liquid, specifically at or near the surface of the liquid 15 (shown in FIG. 5). The system may further comprise a second transducer that modifies the wave generated by the first transducer (shown in FIGS. 6 and 7), and the system may also incorporate a control module 130 that drives the transducer 120 (or transducers) (shown in FIG. 4). Finally, the system may use a canal 150 to transport specimens to the immersion chamber 10 from substantially external to the immersion chamber 10, such as from a stationary liquid bath 140 configured to hold at least one specimen, and a door 160 separates the canal 150 from the immersion chamber 10.

The method of mounting the specimen on the slide includes placing a slide 40 (or plurality of slides) on top of a stage 30 that is arranged substantially within an immersion chamber 10, wherein the stage 30 is substantially above the bottom of and substantially below the top of the immersion chamber 10. The immersion chamber is filled with a liquid, preferably water, such that at least a portion of the slide 40 is immersed in the liquid and the surface of the liquid is below the top of the immersion chamber 10. At this point, the specimen 5 (or a plurality of specimens) is placed in the liquid; because the liquid is denser than the specimen 5, the specimen 5 floats on the surface of the liquid. The transducer 120 is then actuated such that a wave is generated in the liquid in the immersion chamber 10; preferably the wave comprises at least one node arranged substantially above the slide and the liquid retains the specimen 5 substantially proximal to the node. The liquid is then drawn from the immersion chamber 10, such as by a pump 60 or by gravity through a valve 100. As the liquid is drawn from the immersion chamber 10, the surface of the liquid lowers within the immersion chamber 10, and the specimen 5, which is still floating on the surface of the liquid, approaches the slide 40. Once the surface of the liquid lowers beyond the slide 40, the specimen 5 is caught by and thus mounted on the slide 40. The portion of the slide 40 on which the specimen 5 is mounted may be drawn from the liquid, and an additional specimen may be deposited on the slide in like manner but on a different portion of the slide 40. Once an appropriate number of specimens are mounted on the slide 40, the slide 40 with mounted specimen(s) may be removed from the immersion chamber 10 and allowed to dry. This process may then be repeated for a new slide and specimen (s).

The system preferably incorporates an immersion chamber 10 configured to hold a liquid. The density of the liquid is preferably more than the density of the specimen 5 so that the specimen 5 will float on the liquid. The liquid is preferably deionized water, but any other suitable liquid may be chosen such that the density of the liquid is more than the density of the specimen 5. However, additives may also be mixed into the liquid in order to alter the density of the liquid such that the specimen 5 will float on or be suspended in the liquid. Alternatively, a gas may also be bubbled into the liquid in order to reduce the density of the liquid.

The immersion chamber 10 of the preferred embodiment functions to hold the liquid. The liquid is retained within the immersion chamber 10 by a cavity defined by at least one side, a top that is preferably open, and a bottom that is preferably closed. The height of the immersion chamber 10 is preferably greater than its diameter (or width). For example, the immersion chamber 10 may be approximately ten inches tall and approximately six inches in diameter (or width). The immersion chamber 10 is preferably approximately circular, which promotes laminar (or non-turbulent) fluid flow of the liquid when the liquid is drawn from the immersion chamber 10. Laminar fluid flow promotes efficient deposition of the specimen 5 onto the slide 40 while also minimizing any possible damage to the specimen 5. One end of the immersion chamber 10 is preferably flat and completely sealed, while the other end is preferably completely open. The immersion chamber 10 may, however, have any suitable shape and may have any suitable height-to-width ratio. The immersion chamber 10 may also incorporate a plurality of partitions into each of which one or more specimens may be placed over one or more slides. In this embodiment, the partitions may aid in guiding the specimen 5 onto the slide 40 as the liquid is drawn from the immersion chamber 10. Alternatively, the immersion chamber 10 may be one of an assembly of multiple immersion chambers arranged such that the immersion chambers are linked with fluid passages. In this alternative embodiment, the liquid may be drawn from or added to the plurality of immersion chambers concurrently, and a specimen 5 may be mounted on a slide 40 in each immersion chamber 10, thus increasing the throughput of the system per unit of time.

The stage 30 of the preferred embodiment may function to locate the slide 40 during preparation of the specimen 5 onto the slide 40. The stage 30 is preferably arranged within the immersion chamber 10 such that the stage 30 is substantially above the bottom of and substantially below the top of the immersion chamber 10. Preferably, the stage 30 supports the slide in a substantially angled orientation, wherein an angled orientation is defined from horizontal and horizontal is defined as parallel to the surface of the liquid when the liquid is placed in the immersion chamber 10. This arrangement of the stage 30 permits the slide 40 to rest on the stage 30 at an angle such that only a portion of the slide 40 may be immersed in the liquid. Preferably, the slide 40 rests flat on a surface of the stage 30, wherein the stage is supported at an angle between seven and fifteen degrees from horizontal. Alternatively, the stage may be supported such that a significant portion of the stage 30 is parallel to the surface of the liquid in the immersion chamber, wherein the stage 30 incorporates features that support the slide at an angle between seven and fifteen degrees from the horizontal. However, the stage 30 may support the slide 40 at any other angle and by any other means. The stage 30 is preferably circular in geometry and composed of plastic. However, any other material, such as stainless steel or glass, may comprise the stage 30, and the stage 30 may be of any other geometry, such as rectangular or octagonal. Furthermore, the circumference of the stage 30 may extend substantially close to the wall (or walls) of the immersion chamber 10 or alternatively may be offset from the wall (or walls) of the immersion chamber 10 by some appreciable distance. The stage 30 preferably incorporates geometry that permits the liquid to pass from one side of the stage 30 to the opposite side of the stage 30. Preferably, the liquid passes from one side of the stage to the opposite side of the stage via a path that is sufficiently normal to at least one side of the stage. In a first example, the stage 30 may comprise an annular ring defining a central hole, such as a five-inch outer diameter ring with a four-inch diameter central hole. In a second example, the stage 30 may further define a number of small holes situated radially about a larger central hole and arranged at approximately equal intervals about the annular stage 30. In a third example, the stage 30 is comprised of a porous material, such as a fine mesh screen or foam, wherein the liquid can pass through the porous stage 30. However, the stage 30 may be of any other suitable geometry and of any other suitable material or combination of materials. In a preferred embodiment of the stage 30, the stage 30 further comprises an indexing latch that permits a user to raise the slide 40 from the immersion chamber 10 at specified height intervals, thus aiding the user in mounting multiple specimen to the slide 40 at specified intervals along the slide. The indexing latch may be incorporated such that the position of the stage 30 relative to the immersion chamber 10 does not change when the slide 40 is raised; alternatively, the indexing latch may raise the stage 30, thus raising the slide 40, which rests on the stage 30. The indexing latch may be a step block and pawl, a screw-driven platform, or any other suitable device. However, the function of the indexing latch may be achieved by lowering the height of the liquid in the immersion chamber 10 by a specified amount after each subsequent mounting of a specimen 5 on the slide 40.

The stage 30 is preferably supported by a support structure 20. The support structure 20 functions to locate the stage 30 within the immersion chamber 10 such that when the stage 30 rests on the support structure 20 and the slide 40 rests on the stage 30, the slide 40 is completely submersed in the liquid without the liquid overflowing past the top of the immersion chamber 10. The support structure 20 may be integral to the immersion chamber 10. For example, the immersion chamber 10 may be comprised of a circular glass container including three equally-spaced dimples about the circumference of the cylindrical wall of the immersion chamber 10 and protruding from the cylindrical wall toward the center of the container, wherein the dimples are arranged above the bottom of and below the top of the immersion chamber 10 (shown in FIG. 3). In this example, the dimples are of a size and geometry such that the stage 30 rests on the dimples and is suitably located when placed in the immersion chamber 10. Alternatively, the support structure 20 may be separate from the immersion chamber 10. In a first example, the support structure may be a stand comprising three adjustable-length legs that rest upon the bottom of the immersion chamber 10 and which support the stage 30 (shown in FIG. 4). In this example, a user may adjust the support structure 20 to a preferred height such that the stage 30, resting upon the support structure, is suitably located within the immersion chamber 10. In a second example of a support structure 20 that is independent of the immersion chamber 10, the support structure 20 may comprise a hook that loops over a wall of the immersion chamber 10 and extends from the edge of the wall down into the immersion chamber where the support structure incorporates a geometry configured to support the stage 40 in a suitable location. Alternatively, the support structure 20 may be integral with the stage 30. For example, the stage 30 may incorporate a structure that extends upward toward the edge of a wall of the immersion chamber 10, then over the wall, forming a hook that locates the stage 30 at a suitable location within the immersion chamber 10. Furthermore, the system may not include a support structure 20 for the stage 30, but rather the stage 30 may be integral to the immersion chamber. For example, the immersion chamber 10 may be a rectilinear container comprised of folded and welded stainless steel sheet, and the stage 30 may also be comprised of stainless steel sheet welded to the interior walls of the container. However, the stage 30 may be suitably located within the immersion chamber 10 by any other method or structure.

In a first preferred embodiment, the system incorporates a pump 60 that functions to draw liquid from the immersion chamber 10. In an exemplary method of using this preferred embodiment, once the slide 40 is placed on the stage 30, the immersion chamber 10 is filled with liquid such that the liquid level is above the slide 40, and a specimen 5 is floated on the surface of the liquid. Then the pump 60 may be driven such that the level of liquid within the immersion chamber 10 lowers and the specimen approaches the slide 40. Once the specimen 5 is dispensed onto the slide 40 and is thus mounted on the slide 40, the pump 60 may be stopped so that liquid is no longer drawn from the immersion chamber 10. The pump 60 may be of any suitable type, such as a centrifugal pump, a flexible-impeller pump, a diaphragm pump, a gear pump, a rotary-vane pump, a bellows pump, or a syringe-type device. The pump 60 may also be powered by any suitable means, for example, with an electric motor, a gasoline-powered engine, or human power. Furthermore, the pump 60 may be located fully external to the immersion chamber 10, fully within the immersion chamber 10, or a combination of within and external to the immersion chamber. In a first example, the pump 60 is a centrifugal pump powered by an electric motor and arranged fully within the immersion chamber 10 such that the pump 60 rests on the bottom of the immersion chamber 10 and the inlet of the pump 60 is substantially below the slide 40. In this example, a flexible tube may be connected to the outlet of the pump 60 and arranged to pass over the top edge of a wall of the immersion chamber 10 such that the liquid may be pumped through the flexible tube and out of the immersion chamber 10. In a second example, an outlet is incorporated near the bottom of the immersion chamber 10; a nipple is fitted to the outlet and a flexible tube connects the nipple to a hand-powered bellows pump. In this second example a user may operate the pump 60 to draw the liquid from the immersion chamber 10. However, the system may incorporate any other type of pump and any other configuration such that liquid may be drawn from the immersion chamber 10. The system may further incorporate a plurality of pumps. Preferably, the pump 60 operates at a plurality of speeds selectable by a user, and preferably at least one of these speeds produces a volume of flow substantially minimal to limit motion of the liquid in the immersion chamber 10 in a direction tangent to the surface of the liquid, particularly near the surface of the liquid. In one variation of the pump 60, the pump 60 may operate in two directions such that liquid can be both drawn from the immersion chamber 10 and pumped into the immersion chamber 10 by the same pump. Alternatively, the system may include a plurality of pumps wherein at least one pump functions to draw liquid from the immersion chamber 10 and at least one other pump functions to pump liquid into the immersion chamber 10.

In a second preferred embodiment, the system incorporates a valve 100 that functions to release liquid from the immersion chamber 10. In essence, the pump of the first preferred embodiment is replaced by a valve and gravitational force in the second preferred embodiment. In an exemplary method of using this preferred embodiment, once the slide 40 is placed on the stage 30, the immersion chamber 10 is filled with liquid such that the liquid level is above the slide 40, and a specimen 5 is floated on the surface of the liquid. Then the valve 100 may then be opened so that liquid may pass through the valve 100, the level of liquid within the immersion chamber 10 lowers, and the specimen approaches the slide 40. Once the specimen 5 falls onto the slide 40 and is thus mounted on the slide 40, the valve 100 may be closed so that liquid is no longer released from the immersion chamber 10. The valve 100 may be of any suitable type, such as a globe valve, a ball valve, a gate valve, a diaphragm valve, or a butterfly valve. In the variation of the system that uses a valve 100 to release liquid from the immersion chamber 10, an outlet may be arranged on the immersion chamber 10 such that the outlet is below the slide 40 when the slide 40 is placed on the stage 30. The valve 100 may be installed directly on the immersion chamber 10 at the outlet, but it may also be arranged substantially remote from the immersion chamber 10. For example, a tube may connect the outlet of the immersion chamber 10 to the valve 100. The tube may be a flexible hose or a hard line, and the tube may be permanently connected to the immersion chamber 10 (such as by a weld or braze) or temporarily connected to the immersion chamber 10 (as in a flexible tube coupled to a nipple installed in the outlet). However, the valve may be of any other type, arranged in any other location, and connected to the immersion chamber 10 by any other suitable method. There also may be any number of valves, and the system may incorporate both a valve 100 and a pump 60.

The reservoir 70 of the preferred embodiment functions to contain the liquid drawn from the immersion chamber 10 by the pump 60 or released from the immersion chamber 10 by the valve 100. The reservoir 70 may be arranged substantially remote from the immersion chamber 10, or the reservoir 70 may be a separate section or portion of the immersion chamber 10. In the first variation of the invention that incorporates a remote reservoir 70, the reservoir 70 is preferably connected to the immersion chamber 10 by a conduit, such as a tube, hose, or hard line, which permits the liquid to pass from the immersion chamber 10 to the reservoir 70. Furthermore, for the first embodiment (which incorporates the pump 60), the pump may be arranged substantially within the immersion chamber 10 and a conduit may connect on one end to the outlet of the pump 60 and on the other end to the remote reservoir 70. Alternatively, the pump may be arranged between the immersion chamber 10 and the reservoir 70 such that a first conduit connects the pump 60 to the immersion chamber 10 and a second conduit connects the pump 60 to the reservoir 70. Finally, the pump 60 may be arranged within or on the reservoir 70 and a conduit may connect the pump 60 to the immersion chamber. In the variation of the invention (which incorporates the valve 100), at least a portion of the reservoir 70 is preferably arranged substantially below the outlet of the valve so that gravity may draw liquid out of the immersion chamber 10 via the valve 100 and into the reservoir 70. The system may optionally include a conduit may or may not be used to guide the liquid from the valve 100 into the reservoir 70.

In the second variation that incorporates the reservoir 70 as a separate section of the immersion chamber 10, the reservoir 70 may be arranged below, above, or next to the cavity comprising the immersion chamber 10. For example, the immersion chamber 10 and reservoir 70 may be comprised of folded and welded stainless steel sheet, wherein a rectilinear container includes a welded and sealed partition that defines the immersion chamber 10 on one side and the reservoir 70 on the other side. In the embodiment that incorporates a pump 60, the pump 60 may be located substantially within the immersion chamber 10, substantially within the reservoir 70, substantially between the immersion chamber 10 and the reservoir 70, or substantially remote from the immersion chamber 10 and/or the reservoir 70. However, any other arrangement of the reservoir 70, immersion chamber 10, and pump 60 and/or valve 100 may be used. Any number of reservoirs, valves, and/or pumps may also be used. Preferably, the reservoir 70 is arranged such that liquid contained in the reservoir 70 can be pumped or dumped back into the immersion chamber 10, such as by a pump or by a conveyer-bucket system, respectively.

Liquid may pass through the manifold 50 as the liquid is drawn from the immersion chamber 10 by the pump 60 or released from the immersion chamber 10 by the valve 100 (shown in FIG. 3). The manifold 50 of the preferred embodiments functions to reduce motion of the liquid in a direction tangent to the surface of the liquid in the immersion chamber 10, primarily at or near the surface of the liquid. By reducing such motion, the specimen 5 will be less likely to move along the surface of the liquid and away from the location in which the specimen 5 was placed by the user of the system. Specifically, the user of the system may place the specimen 5 substantially directly over slide 40, and if the liquid is induced to move near the surface of the liquid, the specimen 5 may be disturbed such that the specimen 5 is guided away from substantially directly over slide 40. This could result in poor or improper mounting of the specimen 5 on the slide 40 at the end of the mounting process. Therefore, the manifold 50 preferably has a plurality of inlets, wherein the arrangement of the inlets may reduce turbulence in the liquid moving toward the pump 60 or valve 100 and/or may reduce swirling of the liquid when the liquid is removed from the immersion chamber 10. However, the manifold 50 may function in other ways to limit motion of the liquid in the immersion chamber 10 in a direction tangent to the surface of the liquid and substantially proximal to the surface of the liquid. Preferably, the manifold includes at least one outlet connected to the pump 60 and/or valve 100. Several methods may be used to connect the manifold 50 to the pump 60 and/or valve 100: a separate conduit (for example, a hose or tube) may connect the elements; the manifold 50 may mate directly to the pump 60 (or pumps) or valve 100 (or valves) without the need for additional conduit; or the manifold 50 may be integral with the pump 60 or valve 100. However, any other arrangement or geometry of the manifold 50 may be used.

The baffle 110, which is arranged substantially within the immersion chamber 10, functions to reduce motion of the liquid in a direction tangent to the surface of the liquid, primarily at or near the surface of the liquid. By reducing such motion, the specimen 5 will be less likely to move along the surface of the liquid and away from the location in which the specimen 5 was placed by the user of the system. Specifically, the user of the system may place the specimen 5 substantially directly over slide 40, and if the liquid is induced to move near the surface of the liquid, the specimen 5 may be disturbed such that the specimen 5 is guided away from substantially directly over slide 40. This could result in poor or improper mounting of the specimen 5 on the slide 40 at the end of the mounting process. In a first example, the baffle 110 comprises a series of fins arranged radially within a circular immersion chamber 10; at least a portion of the fins are immersed in the liquid when at least a portion of the slide 40 is submersed in the liquid 15 (see FIG. 5), and preferably the fins extend below the lowest part of the slide 40. In a second example, the baffle 110 comprises a screen located within the immersion chamber 10, below the slide 40 and above the inlet of the pump 60, the inlet of the valve 100, and or the inlets of the manifold 50. In a third example, the baffle 110 is in the form of a substantially wide nozzle incorporating a screen and arranged over an inlet through which the liquid is drawn from the immersion chamber 10. However, the baffle 110 may be of any other arrangement or geometry, and a plurality of baffles of similar and/or dissimilar geometries may be arranged within the immersion chamber 10.

The temperature control unit 80 functions to maintain or modify the temperature of the liquid in the system. In producing a specimen 5, oftentimes a relatively large mass of tissue is encased in wax (or another binding agent) to improve rigidity when the tissue is sliced with a microtome. Once the tissue mass is sliced and a specimen 5 is thus created, the wax may offer additional support to the specimen 5, which may improve the likelihood that the specimen 5 will lie flat on the slide once mounted thereon; thus it may be advantageous to limit the temperature of the liquid in the system so that the wax does not melt out of the specimen 5 when placed in the immersion chamber 10. Alternatively, is may be desirable to melt the wax out of the specimen 5 after the slicing process, such as to improve the ability of the specimen 5 to absorb a dye; this may be achieved by raising the temperature of the liquid in the system so that the wax melts out of the specimen 5 when placed in the immersion chamber 10. Therefore there may be an ideal temperature of the liquid used to mount the specimen 5 to the slide 40. The temperature control unit 80 may be preset for a single temperature and thus maintain the liquid in the system at this temperature. Alternatively, the temperature control unit 80 may receive an input from a user and maintain the liquid in the system at a plurality of temperatures, wherein the temperature is based upon the input. Finally, a computer or processor that operates the system may select the desired temperature and communicate this information to the temperature control unit 80, which in turn modifies the temperate of at least a portion of the liquid in the system based upon the desired temperature. In a first example, the temperature control unit 80 may comprise a heating and/or cooling plate upon which the immersion chamber 10 is arranged. In a second example, the temperature control unit 80 may include a heating element disposed substantially within the immersion chamber 10 and/or the reservoir 70. In a third example, the temperature control unit 80 may incorporate a heating and/or cooling element inline with at least a portion of the conduit between the immersion chamber 10 and the reservoir 70, pump 60, or valve 100. The temperature control unit 80 may incorporate a feedback mechanism, wherein the temperature control unit 80 measures the temperature of at least a portion of the liquid in the system and adds or removes heat from at least a portion of the liquid based upon this measurement. The temperature control unit 80 may achieve this measurement with a temperature probe, wherein the temperature probe is arranged substantially within the immersion chamber 10, substantially within the reservoir 70, or substantially within any other element of the system. Alternatively, the temperature probe may be an infrared or laser temperature sensor located substantially remote from the immersion chamber 10 or reservoir 70.

The filter 90 (a semi-permeable membrane) functions to separate debris from the liquid in the system. Debris may include a portion of the specimen 5, wax from the specimen 5, or any other contaminant. The filter 90 may be a paper filter, a screen filter, a sand filter, a charcoal filter, or any other type of filter through which the liquid may pass. In a first example, the filter 90 is a paper filter placed between the stage 30 and the slide 40 before the immersion chamber 10 is filled with liquid. In this example, when the immersion chamber 10 is filled with liquid, the liquid rises up to the stage 30, through the filter 90, and over the slide 40; when the liquid is removed from the immersion chamber 10 after the specimen 5 is floated on the surface of the liquid over the slide 40, the liquid lowers past the slide 40 and the filter 90, wherein the filter 90 catches debris and prevents the debris from passing below the stage 30. After the specimen 5 is mounted on the slide 40 and the slide-specimen assembly is removed from the immersion chamber 10, the filter 90 may be removed and, with it, the debris. In a second example, a first pump draws liquid from the immersion chamber 10 and into a the reservoir 70, and a second pump draws liquid from the reservoir 70, pumps it through a charcoal filter 90, and deposits the liquid in the reservoir 70; the charcoal filter 90 thus prevents debris from flowing back into the immersion chamber 10. The charcoal filter 90 may be cleaned or replaced at some interval. However, any suitable type, arrangement, or number of filters may be used.

The transducer 120 of the preferred embodiments functions to induce a wave in the liquid in the immersion chamber 10 such that the wave alters the motion (or modifies the location) of the specimen 5. The wave may be a travelling wave that pushes the specimen 5, which floats in the liquid, along the surface of the liquid in the immersion chamber 10. This may be accomplished with substantially large-amplitude and substantially low-frequency actuation of the transducer. Alternatively, the transducer 120 may generate a standing wave via substantially low-amplitude, high-frequency actuation. The standing wave in the liquid within the immersion chamber 10 preferably comprises at least one node arranged substantially above the slide 40 such that the wave retains the specimen 5 substantially proximal to the node. The transducer 120 preferably oscillates at a frequency and amplitude that generate such a standing wave within the liquid, but the transducer 120 may also operate at a plurality of frequencies and/or amplitudes that generate waves of one or more such nodes in the liquid. A second transducer, or any number of additional transducers, may interact with the first transducer 120 to alter the wave generated within the liquid in the immersion chamber 10. For example, the second transducer may be arranged substantially orthogonal to the first transducer 120 (shown in FIG. 7) such that the wave emanating from the first transducer 120 is orthogonal to the second wave emanating from the second transducer. If both waves comprise a plurality of nodes, then a linear array of nodes may present in the liquid in the immersion chamber 10. In this example, each of a plurality of specimens may be arranged on the surface of the liquid substantially proximal to a node in the linear node array of nodes, wherein the nodes are arranged substantially above a plurality of slides. In a second example, the first transducer 120 may be arranged on one side of the immersion chamber 10 and the second transducer may be arranged substantially opposite the first transducer 120 and also on the immersion chamber 10 (shown in FIG. 7). In this example, the first and second transducers may operate at substantially different frequencies such that the node (or nodes) generated in the liquid moves toward or away from the first transducer 120 due to combination and cancellation of the waves generated by the two transducers. If the liquid retains the specimen 5 substantially proximal to the node, the motion of the node due to the frequency difference between the two transducers may also prompt the specimen 5 to move. Alternatively, a plurality of transducers may be arranged equidistant around the immersion chamber 10 of circular cross-section (shown in FIG. 6). However, a plurality of transducers (preferably three or more) may be arranged such that the combination of transducers may induce a wave in any combination of directions along three orthogonal axes so that motion of the specimen 5 can be prompted in one, two, or three dimensions.

Figure 5:
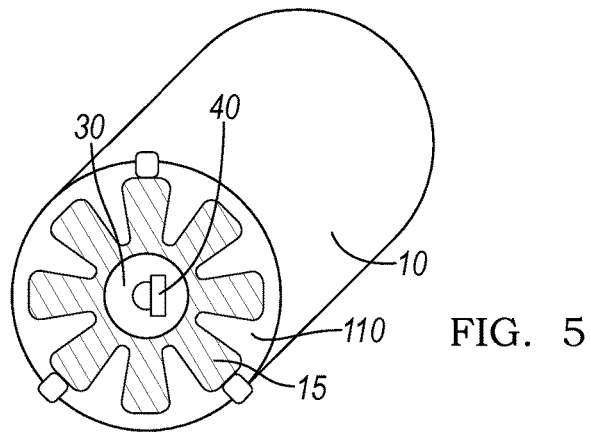

The transducer 120 may be arranged substantially within the immersion chamber 10 (shown in FIG. 4) or substantially external to the immersion chamber (shown in FIG. 5). In the latter variation of the invention, the transducer 120 may directly engage a wall of the immersion chamber such that the wall transmits the motion of the transducer 120 into the liquid in the immersion chamber. Alternatively, the transducer 120 may be arranged substantially proximal to the immersion chamber 10 and at least a portion of a plate connected to the transducer 120 may be immersed in the liquid in the immersion chamber 10 such that the plate transmits motion of the transducer 120 into the liquid. The plate may be a flat sheet, a paddle, or of any other geometry that transmits motion of the transducer 120 into the liquid in the immersion chamber 10. However, the transducer 120 may be arranged by any other means such that the transducer 120 may generate a wave within the liquid in the immersion chamber 10. The transducer 120 may be a linear actuator with a magnetic element and a coil, wherein current passing through the coil induces motion in the magnetic element; a current of a sufficient magnitude and oscillating at a sufficient frequency may operate the transducer such that a desirable standing wave is generated within the liquid in the immersion chamber 10. Alternatively, the transducer may comprise an electric motor, a first magnet arranged substantially eccentrically on the output shaft of the motor, a plate arranged substantially proximal to the magnet, and a second magnet arranged on the plate such that it repels the first magnet (shown in FIG. 8). In this example, a current applied to the leads of the motor may cause the motor to rotate, and the magnetic force between the first and second magnets may cause the plate to oscillate fore and aft. In a third example, the transducer may incorporate an air motor operating a cam that causes a plate to move fore and aft, wherein at least a portion of the plate is submerged in the liquid in the immersion chamber 10. However, the transducer 120 may be any type of device or combination of devices configured to generate a travelling and/or standing wave in the liquid in the immersion chamber 10.

The control module 130 preferably functions to drive the transducer 120 by transmitting energy to the transducer, wherein the transducer 120 converts the energy into motion that generates a standing and/or travelling wave within the liquid in the immersion chamber 10. In a first example, the transducer 120 is an electromagnetic linear actuator and the control module 130 is a power supply configured to generate a sinusoidal output current of varying amplitude and frequency. In a second example, the transducer 120 is again an electromagnetic linear actuator, but the control module 130 comprises an amplifier connected to a computer and configured to drive the transducer 120, wherein the computer incorporates software and a user interface to modify the frequency and/or amplitude output of the amplifier. In a third example, the control module 130 comprises a rheostat that adjusts the amplitude of the signal transmitted to the transducer 120. In this third example, two or more transducers may be equally spaced around the immersion chamber and driven at sufficiently different frequencies; a rheostat may be connected to each transducer such that each rheostat may modify the amplitude of the current driving the rheostat's respective transducer; by independently modifying the amplitudes of the currents driving the transducers, a user may alter the location and/or motion of the node (or nodes) in the liquid in the immersion chamber. However, the control module 130 may comprise any other device or combination of devices. The control module 130 may further modify its output to the transducer 120 based on a variety of inputs. First, the control module 130 may receive an input from a user, such as through an interface on a computer or a series of switches and dials on a power supply, wherein the input directly pertains to a modification of the frequency and/or current of the output of the control module 130. In a second example, the control module 130 may receive a request from a user or device, wherein the request directly pertains to a location in which it is desired that the specimen 5 (and thus node) be moved, and the control module determines and implements the appropriate amplitudes and/or frequencies of the transducer 120 (or transducers) such that the specimen 5 may be moved to the desired location. In a third example, the control module 130 may be entirely automated and thus automatically manipulate the specimen 5 into a specific location without additional external inputs. However, the control module 130 may alter the motion or position of one or more transducers based upon any other code, configuration, or input, or any combination thereof.

The system of the preferred embodiments also includes a canal 150, which functions to convey the specimen 5 to the immersion chamber 10 from substantially external to the immersion chamber (shown in FIG. 6). Preferably, the specimen 5 is sliced at a cutting stage arranged above the stationary liquid bath 140; the specimen 5 then drops into the stationary liquid bath 140 and is subsequently is transferred to the immersion chamber 10 via the canal 150. Alternatively, the specimen 5 may be sliced at a cutting stage arranged above the canal 150 and the specimen 5 drops directly into the canal 150 before being transferred to the immersion chamber 10. However, the specimen 5 may enter the canal 5 by any other method. In one embodiment of the canal 150, a jet of liquid moving from one end of the canal 150 to the other impels the specimen 5 to the immersion chamber 10, such as from the stationary liquid bath 140. For example, the canal 150 may comprise a Teflon-coated trough and the jet of liquid creates a volume of fluid flowing along the trough, wherein the fluid has a depth of approximately five millimeters in the trough. When the specimen 5 reaches the immersion chamber 10, the location of the specimen 5 may be altered by a wave induced in the liquid in the immersion chamber 10, such as by varying the frequency and/or amplitude of the motion of the transducer 120 (or transducers). Alternatively, when the specimen 5 reaches the immersion chamber 10, a standing wave may be used to stop the movement of the specimen 5. The liquid flowing in the canal and used to impel the specimen 5 toward the immersion chamber 10 may be recirculated, such by pumping the liquid into the stationary liquid bath 140 or by using the liquid again to impel an additional specimen along the canal; the liquid in the canal may be filtered before being recirculated. The volume flow rate and/or velocity of the liquid jet may be controlled manually, such as by an operator of the system, or automatically, such as by a computer or other control device.

The system of the preferred embodiments also includes a door 160, that separates the canal 150 from the immersion chamber 10 and functions to allow the specimen 5 to enter the immersion chamber 10 from the canal 150 when open and to the block liquid (and potentially other specimens) from entering the immersion chamber 10 when closed. The door 160 is preferably incorporated into the system such that liquid entering into the immersion chamber from the canal (such as liquid comprising the jet of liquid) does disrupt the position of the specimen 5 in the immersion chamber, which would impede the process of mounting the specimen 5 onto the slide 40. Thus, the door 160 may also function to inhibit flow of liquid into the immersion chamber 10 during the specimen mounting process. The door 160 may be operated manually, such as by manually opening and closing a latch or by manually triggering a solenoid to open or close the door 160. Alternatively, a computer or other control device may regulate the state of the door 160.

The system may be controllable via a control system such as, for example, a computer. Alternatively, or additionally, the system may be controllable using manual controls affixed to one or more components of the system.

In an alternative embodiment, the system may incorporate a plurality of immersion chambers (each with a stage and transducer) and at least one canal with multiple tributaries feeding the immersion chambers (or multiple canals, each leading to an immersion chamber). In this embodiment, multiple slides may be prepared simultaneously, and a control system operates the system automatically. For example, the control system may monitor the number of specimens ready to be mounted and selectively impel a specimen down canal toward a given immersion chamber. The door between the canal and immersion chamber may be opened at an appropriate time such that the specimen enters the immersion chamber, at which point the door is automatically closed. The control system may then automatically position the slide to the appropriate height (and angle) and position the specimen over the slide by manipulating the transducer(s). Subsequently, the control system may draw liquid from the immersion chamber such that the specimen is mounted on the slide. The control system may then repeat the process and mount an additional specimen onto the slide, indicate to an operator to remove and replace the slide, or automatically remove and replace the slide, such as with a robotic arm. However, one or more operators and/or one or more control systems may conduct any step of the method and/or operate any element of the system.

As a person skilled in the art will recognize from the previous detailed description and from the figures and claims, modifications and changes can be made to the preferred embodiments of the invention without departing from the scope of this invention as defined in the following claims.

I claim:

1. A system for mounting a specimen on a slide, the system comprising:
   an immersion chamber configured to hold a liquid and comprising at least one wall, a closed bottom, and an open top;
   a stage configured to support the slide, wherein the stage is arranged within the immersion chamber such that, in operation, the specimen is supported substantially above at least a portion of the stage by the liquid;

a transducer configured to induce a first wave in the liquid in the immersion chamber, wherein the first wave alters a motion of the specimen; and a liquid level modulator that enables modulation of a level of liquid in the immersion chamber, wherein in a first operation mode, the liquid level modulator reduces the level of liquid in the immersion chamber and the specimen is dispensed onto the slide.

2. The system of claim 1, further comprising a filter configured to separate debris from the liquid.

3. The system of claim 2, wherein the stage is configured to support the filter such that the filter is arranged on top of the stage and the slide is arranged above the filter.

4. The system of claim 1, further comprising a temperature control unit configured to modify a temperature of at least a portion of the liquid.

5. The system of claim 1, further comprising a control module configured to drive the transducer at a drive frequency.

6. The system of claim 5, wherein the control module receives an input from a user and modifies the drive frequency based upon the input.

7. The system of claim 1, wherein the transducer is arranged substantially on a wall of the immersion chamber.

8. The system of claim 1, further comprising a second transducer configured to induce a second wave in the liquid in the immersion chamber, wherein the second wave is non-parallel to the first wave.

9. The system of claim 1, further comprising a canal configured to convey the specimen to the immersion chamber from a location substantially external to the immersion chamber.

10. The system of claim 9, further comprising a door arranged substantially between the canal and the immersion chamber and configured to release the specimen from the canal into the immersion chamber.

11. The system of claim 1, wherein the liquid level modulator comprises a valve, positioned on a wall of the immersion chamber, that allows the liquid to leave the immersion chamber, thereby reducing the level of liquid in the immersion chamber in the first operation mode.

12. The system of claim 1, wherein the liquid level modulator comprises a pump, coupled to the immersion chamber, that allows the liquid to leave and enter the immersion chamber.

13. A method for arranging a specimen on a slide, the method comprising the steps of:

positioning the slide on a stage arranged within an immersion chamber;

filling the immersion chamber with a liquid such that at least a portion of the slide is immersed in the liquid;

receiving the specimen into the immersion chamber, such that the specimen floats on a surface of the liquid;

upon generating a wave in the liquid that alters motion of the specimen within the immersion chamber, positioning the specimen substantially over the slide; and modulating a level of liquid within the immersion chamber, such that the level of liquid in the immersion chamber decreases in a first operation mode and the specimen is dispensed onto the slide.

14. The method of claim 13, further comprising selecting the liquid such that a density of the liquid permits the specimen to float in the liquid.

15. The method of claim 13, further comprising modifying a temperature of at least a portion of the liquid in the immersion chamber.

16. The method of claim 13, wherein positioning the specimen comprises driving a transducer to generate the wave in the liquid.

17. The method of claim 16, further comprising modifying a drive frequency of the transducer in order to alter a feature of the wave generated by the transducer.

18. The method of claim 13, wherein positioning the specimen with generation of the wave comprises generating the wave with a node and retaining the specimen substantially proximal to the node.

19. The method of claim 13, further comprising impelling the specimen along a canal, such that the specimen is transferred into the immersion chamber from a location substantially external to the immersion chamber.

* * * * *